(12) United States Patent
Peebles et al.

(10) Patent No.: US 6,237,047 B1
(45) Date of Patent: May 22, 2001

(54) SIGNAL PROCESSING SYSTEM INCLUDING PLURALITY OF PROCESSING CARDS COMMUNICATING WITH PLURALITY OF INDEPENDENT CPU

(75) Inventors: Brian Peebles, Cranford; Charlie Walden, Montclair, both of NJ (US); Steven Magnell, Cohasser, MA (US)

(73) Assignee: Dialogic Corporation, Parsippany, NJ (US)

( * ) Notice: Subject to any disclaimer, the term of this patent is extended or adjusted under 35 U.S.C. 154(b) by 0 days.

(21) Appl. No.: 09/388,097

(22) Filed: Aug. 30, 1999

Related U.S. Application Data

(63) Continuation of application No. 08/723,555, filed on Sep. 30, 1996, now abandoned.

(51) Int. Cl.[7] .............................. G06F 3/00; G06F 15/00; G06F 9/00; G06F 9/44
(52) U.S. Cl. .................. 710/5; 710/5; 710/7; 712/225; 704/200
(58) Field of Search .................................. 710/12, 38, 5, 710/7; 709/105, 226, 202; 714/7, 30; 704/200; 712/225

(56) References Cited

U.S. PATENT DOCUMENTS

| | | | |
|---|---|---|---|
| 4,764,868 | * 8/1988 | Ketelhut et al. | 364/200 |
| 5,581,709 | * 12/1996 | Ito et al. | 395/200.15 |
| 5,590,328 | * 12/1996 | Seno et al. | 395/675 |
| 5,651,110 | * 7/1997 | Powers et al. | 395/182.05 |

\* cited by examiner

*Primary Examiner*—Thomas Lee
*Assistant Examiner*—Chun Cao
(74) *Attorney, Agent, or Firm*—Kaplan & Gilman, LLP

(57) ABSTRACT

A voice processing architecture is disclosed wherein a plurality of voice processing cards are resident on a network but which are not deployed within a resident host computer. The host computers are located throughout the network, and any voice processing card may be controlled by any host computer.

4 Claims, 4 Drawing Sheets

SIGNAL PROCESSING SYSTEM INCLUDING PLURALITY OF PROCESSING CARDS COMMUNICATING WITH PLURALITY OF INDEPENDENT CPU

This application is a continuation application of U.S. patent application Ser. No. 08/723,555 filed Sep. 30, 1996, now abandoned.

TECHNICAL FIELD

This invention relates to data and voice processing, and more particularly, to an improved technique of implementing distributed voice, media, and data processing systems in a networked environment.

DESCRIPTION OF THE PRIOR ART

Voice processing systems have become prevalent over the last decade. These systems are utilized in nearly every industry, and the growth of such systems is expected to continue over the next several years. Such systems include various techniques of merging computer technology and telephony and include systems such as voice mail, automatic facsimile distribution, automatic attendant, etc.

The fundamental architecture for voice processing systems is based upon the personal computer. Specifically, one or more voice cards are plugged into the internal bus of the PC computer, and one or more phone lines are plugged into the voice cards. The voice card appears to the central processing unit (CPU) of the PC as any other peripheral card plugged into the PC bus. The voice card performs basic functions such as recognizing dual tone multi-frequency (DTMF) tones, generating particular signals, and conveying voice and data information from the telephone line to the CPU and from the CPU back to the telephone line.

A function of the CPU is to implement what is termed applications software. For example, consider a bank which provides a voice processing system allowing customers to dial in, enter an account number, and receive balance and other account information by telephone. The CPU will implement the software required to retrieve the balance, transfer funds, verify an account number, or perform other such functions related to the particular banking application.

In order to receive the information entered by the bank's customer, the CPU communicates with and controls the voice cards. While voice processing systems have become much more sophisticated over the past several years, the basic architecture of a host CPU in a PC based platform, with a separate voice card, has remained standard for at least ten years. The CPU provides an operating system and user interface for easy programming and running of the applications software, and the voice processing card provides specialized functions related to DTMF tone recognition, dialing, etc. A typical system, as described below, might include 8 voice cards in a chassis, all controlled by one CPU.

FIG. 1 shows a present day voice processing system connected to both a data network (e.g. the internet or corporate LAN) as well as to the Public Switched Telephone Network (PSTN). The arrangement of FIG. 1 may facilitate communications between various telephones and computer devices. The arrangement of FIG. 1 shows a VME bus, rather than a PC bus, but either may be used in present day systems.

FIG. 1 shows the PSTN 101 and data network 102, along with a plurality of voice processing cards 104. The voice processing cards may include one or more basic voice processing functions such as tone detection, tone generation, dialing capability, voice recognition, compression, echo cancellation, etc. In accordance with standard techniques known in the industry, the voice processing card is controlled by a central processing unit card 103.

The applications software required to run the voice processing system runs on the CPU which also communicates with the data network 102. If information is to be sent from a computer 107 to a telephone 105, the information must be routed through CPU 103*a* as shown, then over the computer's bus to a voice card 104, and further, out over PSTN 101 to telephone 105. Thus, if CPU 103*a* becomes non-operational, the voice boards 104 can no longer function.

In one mode of operation, a voice processing application communicates with a remote user 105 over PSTN 101. The voice processing application, resident on CPU card 103*a*, communicates with voice processing cards 104 over bus 106. Information is conveyed from voice processing cards 104 to remote caller 105 via the public switched telephone network, and tones entered by a user of telephone 105 are decoded and sent to CPU 103 for the appropriate action to be taken.

In other modes of operation, the application may be running on a different computer 107 located elsewhere on the data network 102. In such a situation, the CPU 103 serves to communicate with the computer 107 via data network 102. In all cases, the CPU 103 controls all voice processing functions, as well as receipt and routing of data.

There are several problems with the above architecture. First, when the voice processing system is utilized in a large network with many users, there is little if any need for the users to reprogram the voice processing system, or to interact directly with the CPU. Rather, the interaction with the voice processing system is entirely over the telephone network and through the voice processing cards. This means that all of the hardware and software associated with the CPU and the entire personal computer is hardly used during operation. Thus, the system is more costly than necessary.

An additional drawback of the above architecture is the fact that depending on the operating system (i.e. Unix, windows), a CPU can typically only support a small number of voice cards, perhaps 6–12. For large systems which require many voice cards, there will be several CPU's required, increasing cost and potential points of failure in the system. Additionally, since all data is routed through the CPU, the processing of such data and communications of such data, between the CPU and voice processing card often represents a bottle neck in the system and limits the speed at which the voice processing system can operate.

Still another drawback of the architecture is the fact that the CPU and voice processing system share the same bus. This means that both circuit cards must be compatible. Additionally, should the voice processing card or the CPU, hard disk, power supply, etc. become damaged or inoperable, the result is total system failure.

Still another drawback of the above systems can best be described by considering a typical "play" operation. During such an operation, the digitally stored voice is read from the computer's hard disk by the CPU, and transferred to the voice board for processing and transmission. Consider a voice processing system with eight voice boards and a CPU in a single chassis. If each board is servicing a call, the CPU, to play a message to a caller, must (i) read the information from the hard disk and (ii) transfer that information to the voice board for processing and transmission, all while continuing to service the other boards. Thus, because the relationship of CPU boards to voice boards is one to many, and because the entire system is dependant upon the operating system of the host,. the CPU represents a bottleneck.

For the above and other reasons, it is desirable to design a new Voice Processing System (VPS) architecture which can be utilized in large networks, operate at high speeds, and be implemented in a cost efficient fashion. Moreover, with the convergence of voice and data systems, and the emergence of mixed media systems, the VPS architecture should handle other forms of media as well.

SUMMARY OF THE INVENTION

The above and other problems of the prior art are overcome in accordance with the present invention which relates to a signal processing card wherein the CPU controlling such card has been remotely located, and the functions thereof have been distributed. In accordance with the techniques of the invention, the signal processing system, which may be used to process voice, data, or other information is based upon a plurality of processing cards, wherein the CPU is not installed in the same rack. The processing cards communicate over the telephone network or a data network directly with a remote user, and no local or single controlling CPU is required. The functionality previously implemented by the CPU is distributed among the different processing cards, as well as other computers connected to the processing cards via a data network such as, for example, a local or wide area network.

Importantly, the signal processing card may communicate directly over a data network and over the telephone network. The signal processing card uniquely merges voice and data on a single network.

BRIEF DESCRIPTION OF THE DRAWINGS

FIG. 2 shows an exemplary embodiment of the present invention comprising a plurality of processing cards 201 to 210, each of which is connected to an Ethernet or ATM data network 102, as well as to the Public Switched Telephone Network (or corporate PBX). As can be seen from FIG. 2, computer 215, or any other computer on data network 102, may run the applications software while the signal processing functions are implemented by any of the processing cards 201 through 210.

Figure 1:
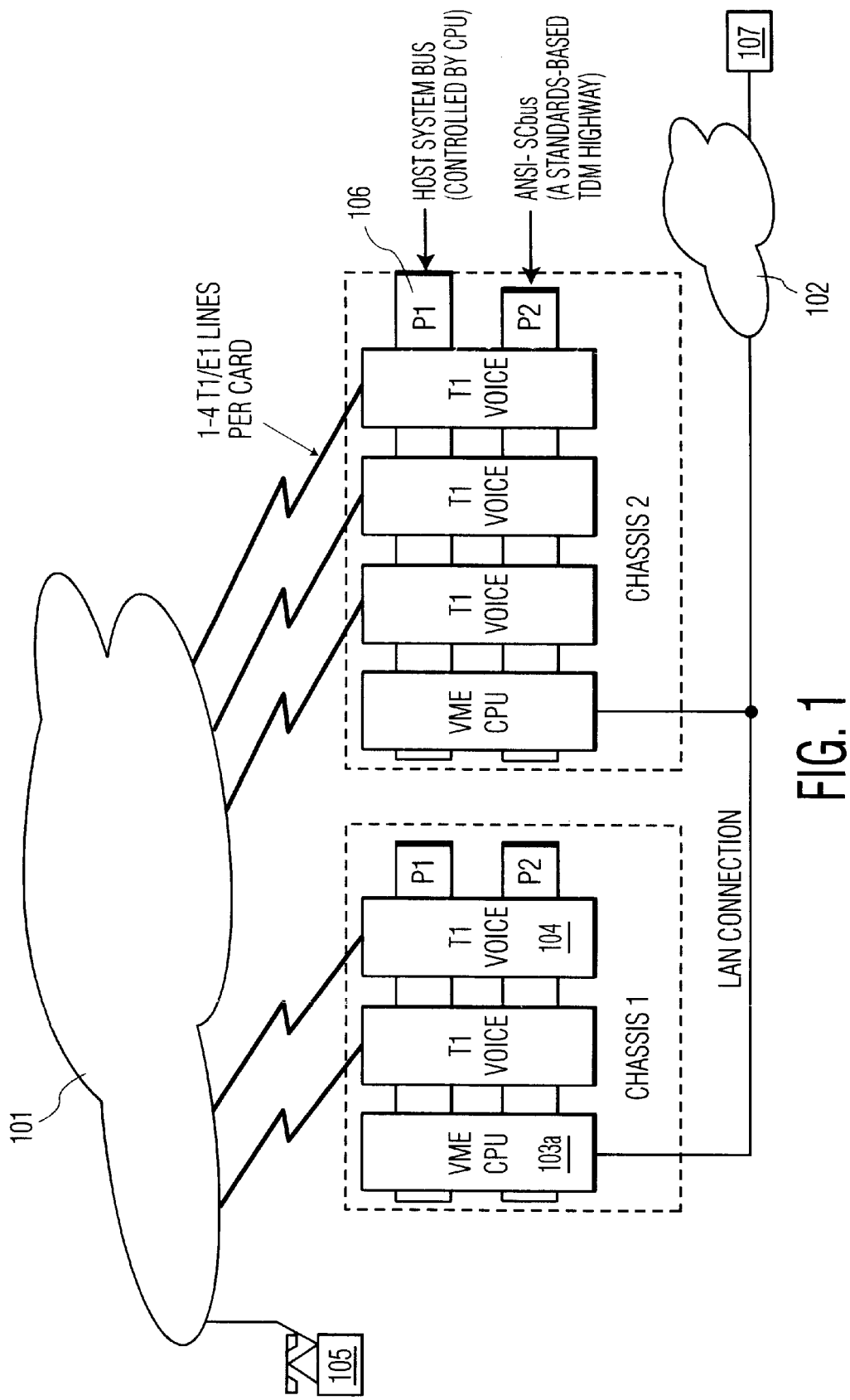
FIG. 1 shows a present day voice processing configuration connected to both a telephone network and a data network.
Figure 2:
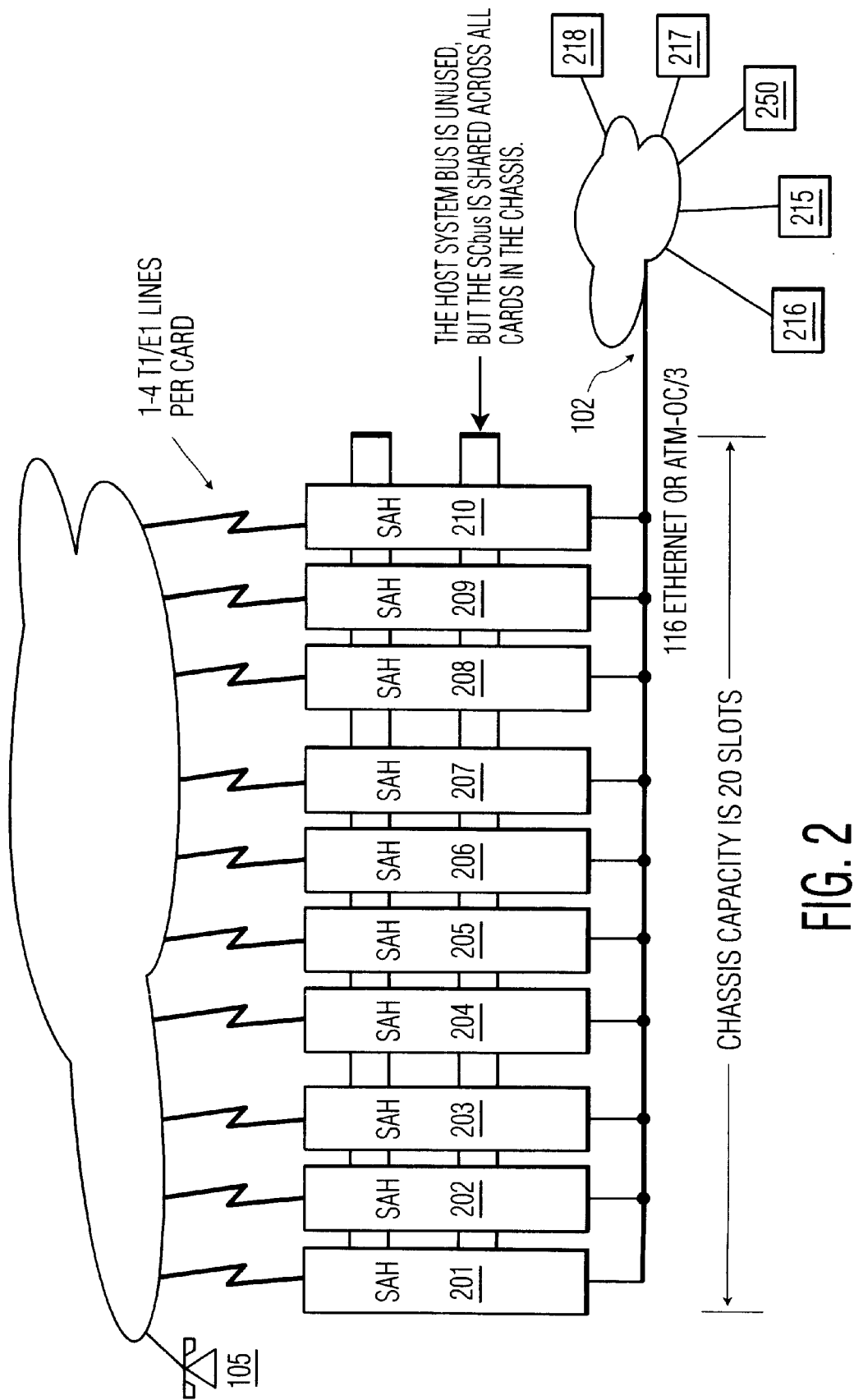
FIG. 2 shows a configuration in accordance with the present invention connecting a plurality of signal processing cards to both the phone and data networks.

Quite notably, each processing card 201–210 may communicate directly with either the PSTN 101 or data network 102. In either case, communications need not be routed through a CPU. Accordingly, each processing card may remain fully operational if and when other processing cards are rendered non-operational.

By way of definition, processing card refers to a circuit card that may receive signals from a remotely located voice or data terminal and process those signals in accordance with commands from a host. Exemplary signal processing functions which might be implemented include, but are not limited to, playing or recording sound, detecting tones, cancelling echoes, data/voice compression, voice recognition, speaker authentication, data transformation, speech systems, fax, call control, signalling, etc.

A CPU refers to a remote host computer running applications software. The applications software and the CPU may utilize signal processing functions of the remotely located processing card.

In operation, the user is connected through PSTN 101 to any of the plurality of processing cards 201 through 210. The processing card answers the telephone and establishes communications with the appropriate computer 215 running the applications program.

After communications between a user 105 or user 215, for example, and one of processing cards 201–210 is established, the processing card must determine with which CPU it should communicate. There are several techniques of resolving this issue. Depending upon the data entered, the processing card 201–210 can determine with which CPU it should communicate over network 102.

Alternatively, the processing card 201–210 may have a priority scheme. Specifically, a particular processing card 205 may be programmed such that all its applications software is resident on CPU 215, unless and until CPU 215 is non-operational, in which case a CPU 216 is utilized. Another possible technique is to classify the processing applications such that each processing board 201–210, after it determines which application is running, may uniquely determine which CPU with which to communicate.

Importantly, each processing card 201–210 includes its own separately addressable network address on the data network 102. The applications software may run on a CPU card connected to network 102, and the CPU card may be located anywhere in the world. Moreover, if a CPU card fails, it does not render plural processing cards non-operational, as in the prior art. Rather, none of the processing cards will be affected by such failure, and other CPUs on the network may still use all processing cards.

Figure 3:
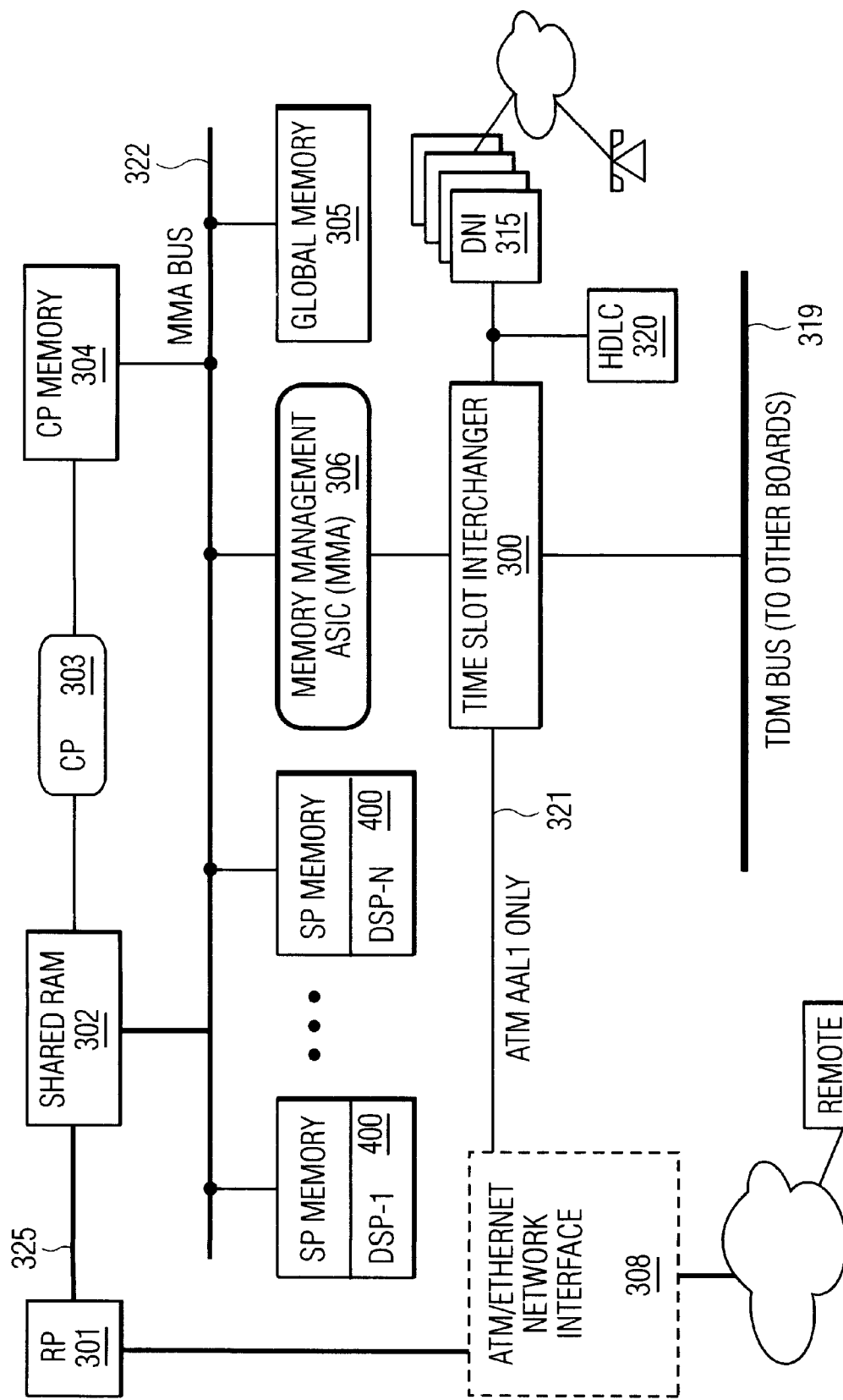
FIG. 3 shows the architecture of an inventive signal processing card to be utilized in the inventive configuration.

FIG. 3 shows a block diagram of the hardware architecture for the present invention. The arrangement of FIG. 3 is intended to be duplicated for each circuit card desired for the system. As can be appreciated from the above, by providing each processing card with its own independent data and voice interface, as shown in FIG. 3, the processing card becomes independent of any CPU failures or bottlenecks.

Digital signal processor (DSP) chips 400 perform functions such as tone recognition, text to speech conversion, data compression or expansion, etc. These functions are well known in the art and can be implemented via commercially available digital signal processor devices. Numerous algorithms and hardware for implementing processing functions are known in the art, and will not be described in detail herein.

The Memory Management Application Specific Integrated Circuit (MMA) 306 and time slot interchanger 300 act in conjunction with one another to form a switch for exchanging data between memories 302, 304, and 305 located on the bus-side of MMA 306, and the Time Division Multiplexed (TDM) bus 319, Digital Network Interfaces, 315 or 320 or ATM AAL1 interface 321, located on the other side of MMA 306.

The network interface 308 connects the arrangement to a data network which, in the example shown, is an Ethernet or ATM network. Network interface 308 allows communication between a remotely located host and the signal processing functionality shown in FIG. 3.

In operation, the signal processing functionality is implemented on DSP's 400 which communicate with one another over the MMA 322 (via the MMA). Multiple boards co-located in a single chassis can share voice and data with each other via the TDM-bus 319. Multiple boards not co-located in a single chassis can share voice and data with each other over the LAN/WAN.

Consider a remote application desiring to utilize the voice processing functionality of FIG. 3. The appropriate commands are transmitted from the remote host (not shown) via a data network through the network interface 308. The network interface transmits the commands and/or data to a routing processor 301 which loads them into a shared ram 302, via interface 325.

Control processor 303 is an off-the-shelf processing chip, which transfers information between host shared ram 302 and DSP's 400 (via the MMA 306) so that such information may be processed appropriately. The MMA manages the transfer of data between various portions of the system.

It is noted that in prior art voice processing systems, the shared ram is typically connected to the host bus, at reference point 325. The routing processor 301 and network interface 308 would be replaced with the CPU running applications software. In the present invention, CP 303 need not be altered in any way but rather, can operate just as if a host was resident in the inventive system. Nonetheless, by removing the host and placing it remotely, and by substituting RP 301 and interface 308 for the local host, any host on the network can control any signal processing function, be it voice or data, on any processing card in the network.

The signal processing card may be any card that receives voice or data and performs signal processing functions. Such functions may include tone detection, playing, recording, data and voice compression or expansion, echo cancellation, speech recognition or authentication, various transformations, or any of a variety of other such functions. The host is any computer which requests any of the functions to be performed by the signal processing card.

The other portions of the arrangement of FIG. 3 not yet described in detail include interfaces 315–320, which are standard interfaces well known in the art. Both of DNI interface 315 and HDLC interface 320 are standard interfaces for communicating over the telephone lines.

Figure 4:
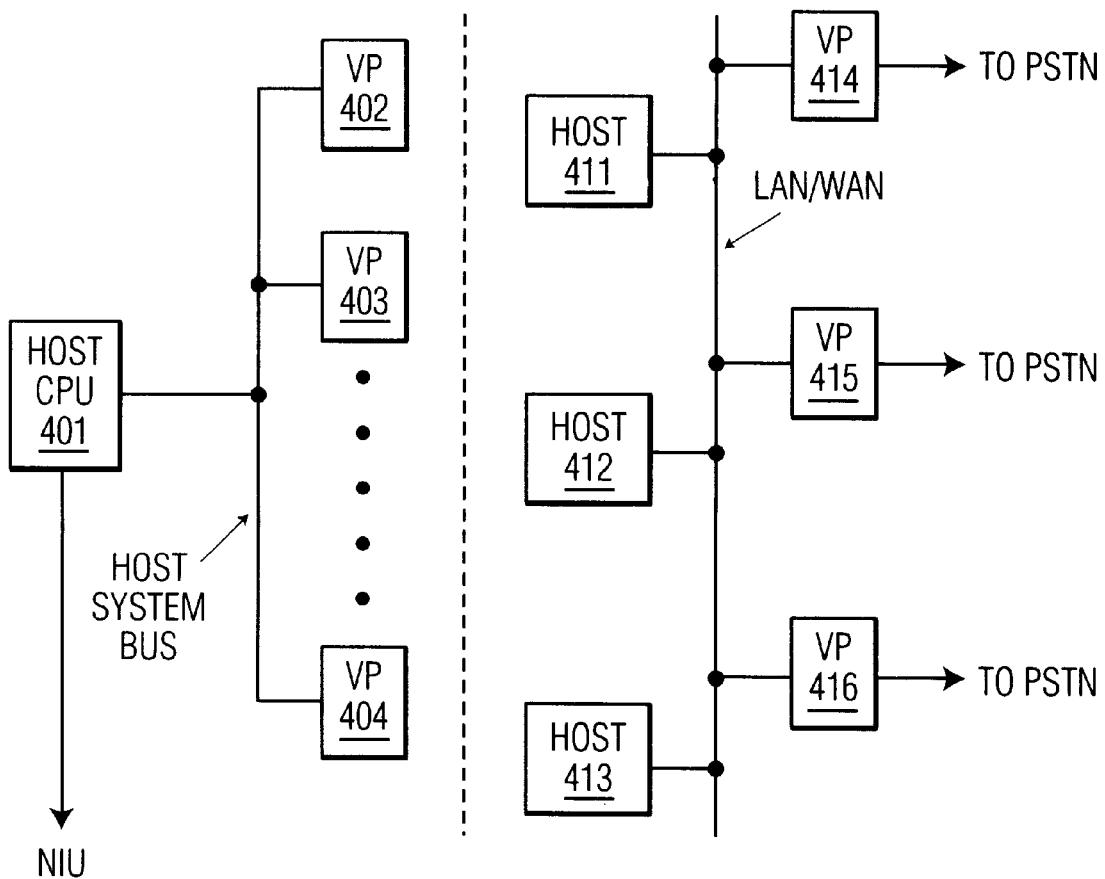
FIG. 4 shows a conceptual diagram of the interconnection between the host and several voice processing boards, as such interconnection is implemented in the prior art as well as in the present invention.

FIG. 4 shows a conceptual comparison between the prior art arrangement and the arrangement of the present invention. As can be seen in FIG. 4, the prior art includes a host CPU 401 which utilizes several voice processing circuit cards 402 through 404. Additionally, the host communicates with the network through a Network Interface Unit (NIU). (Not shown).

On the right side of FIG. 4 is shown the inventive architecture which includes a network 409, which may be any local or wide area network, and a plurality of hosts 411 through 413. The processing cards 414 through 416 may be located anywhere on any network. Any host may utilize the processing functions of any processing card, and the processing card need not have a resident host computer in the same chassis.

One can view the inventive architecture as an intelligent switch and media processing unit which may be used to route data interchangeably between data and voice networks. The processing cards 414–416 may be dispersed anywhere throughout the network, and any CPU in the network may utilize any processing card.

While the above describes the preferred embodiments of the invention, it will be apparent that various other modifications and/or additions will be apparent to those of ordinary skill in the art. It is intended that these modifications be covered by the claims appended hereto.

What is claimed is:

1. A signal processing system comprising:
    an enclosure containing a plurality of signal processing cards, each including voice, data, and media processing functions,
    a remotely located plurality of central processing units (CPUs) running application software for controlling and commanding said signal processing cards, any of said CPUs being independent to any of said signal processing cards, and,
    a data network unitizing phone or datalink arranged to establish communications between any of said CPUs and any of said signal processing cards, wherein said signal processing cards implement software such that any CPU may control or command any signal processing card, and wherein a signal processing card determines with which CPU to communicate based upon which application is running.

2. The system of claim 1 wherein a plurality of signal processing cards are housed in an enclosure and arranged in a receptacle rack mounting system absent a CPU, each of said signal processing cards maintains a connection to said data network and a connection to a telephone network.

3. The system of claim 1 wherein said voice processing functions include one or more of the following: echo cancellation, tone detection, voice recognition, speaker verification, facsimile, call processing, text-to-speech, conferencing, or data compression.

4. The system of claim 1 wherein said signal processing cards receives commands from a second CPU if said first CPU is rendered non-operational, if a designated signal processing card is non-operational means for substituting other of said plurality of signal processing cards.

* * * * *